US012726925B2

(12) United States Patent
Vadivelu

(10) Patent No.: US 12,726,925 B2
(45) Date of Patent: Sep. 1, 2026

(54) HIGH PRECISION POSITIONING FOR MOBILE DEVICES

(71) Applicant: Snap Inc., Santa Monica, CA (US)

(72) Inventor: Praveen Babu Vadivelu, Erie, CO (US)

(73) Assignee: Snap Inc., Santa Monica, CA (US)

( * ) Notice: Subject to any disclaimer, the term of this patent is extended or adjusted under 35 U.S.C. 154(b) by 300 days.

(21) Appl. No.: 18/379,268

(22) Filed: Oct. 12, 2023

(65) Prior Publication Data

US 2025/0126581 A1 Apr. 17, 2025

(51) Int. Cl.

| | |
|---|---|
| ***H04W 56/00*** | (2009.01) |
| ***G01S 19/08*** | (2010.01) |
| ***G01S 19/23*** | (2010.01) |

(52) U.S. Cl.

CPC ......... *H04W 56/0035* (2013.01); *G01S 19/08* (2013.01); *G01S 19/235* (2013.01)

(58) Field of Classification Search

CPC .... G01S 19/235; G01S 19/254; G01S 19/256; G01S 19/246; G01S 19/29; G01S 19/05; G01S 19/258; G01S 5/0063; G01S 19/03; G01S 19/42; G01S 19/43; G01S 19/45; G01S 19/13; G01S 19/24; H04B 7/01; H04B 7/18513; H04W 56/0035; H04W 56/0045; H04W 64/00

See application file for complete search history.

(56) References Cited

U.S. PATENT DOCUMENTS 5,418,538 A * 5/1995 Lau .......................... G01S 19/29 342/357.77
6,958,726 B1 * 10/2005 Abraham ................ G01S 19/06 342/357.73
8,502,732 B2 8/2013 Pon
9,075,139 B2 * 7/2015 Mizuochi .............. G01S 19/254
2003/0201935 A1 10/2003 King et al.

(Continued)

OTHER PUBLICATIONS

"International Application Serial No. PCT/US2024/050366, International Search Report mailed Apr. 2, 2025", 5 pgs.

(Continued)

*Primary Examiner* — Olumide Ajibade Akonai

(74) *Attorney, Agent, or Firm* — Schwegman Lundberg & Woessner, P.A.

(57) ABSTRACT

A mobile device uses information from another mobile device to perform satellite position fix operations. The information enables the mobile device to perform the satellite position fix operation with less power. Additionally, the information enables the mobile device to determine a position of the mobile device more precisely at significantly lower power consumption. Example methods include receiving, via a wireless communication protocol, an indication of a space vehicle identification (SVID) and an indication of a frequency error for a space vehicle indicated by the SVID and performing an acquisition procedure for the space vehicle using the frequency error as a starting frequency. The method may further include receiving a ratio of the carrier power over the noise power for a unit bandwidth (C/N), determining an integration time based on the C/N, and performing the acquisition procedure for the space vehicle using the frequency errors as a starting frequency error and using the integration time.

20 Claims, 12 Drawing Sheets

(56) References Cited

U.S. PATENT DOCUMENTS

| | | | | |
|---|---|---|---|---|
| 2019/0369264 | A1* | 12/2019 | Hua | G01S 19/36 |
| 2021/0103057 | A1* | 4/2021 | Boudaud | G01S 19/258 |
| 2023/0231591 | A1* | 7/2023 | Russell | H04W 4/023 |

OTHER PUBLICATIONS

"International Application Serial No. PCT/US2024/050366, Written Opinion mailed Apr. 2, 2025", 7 pgs.

Morosi, Simone, "Cooperative GPS positioning with peer-to-peer time assistance", 4th International conference on wireless communications, vehicular technology, information theory and aerospace and electronic systems, IEEE, (May 11, 2014), 1-5.

* cited by examiner

HIGH PRECISION POSITIONING FOR MOBILE DEVICES

TECHNICAL FIELD

Examples of the present disclosure relate generally to high-precision positioning for mobile devices. More particularly, but not by way of limitation, examples of the present disclosure relate to a first mobile device performing satellite fix operations and providing to a second mobile device information to enable the second mobile device to perform satellite fix operations in accordance with the information provided by the first mobile device.

BACKGROUND

Mobile devices have become ubiquitous. Many applications used on mobile devices require positioning information. But positioning information may be imprecise and may require a lot of energy.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
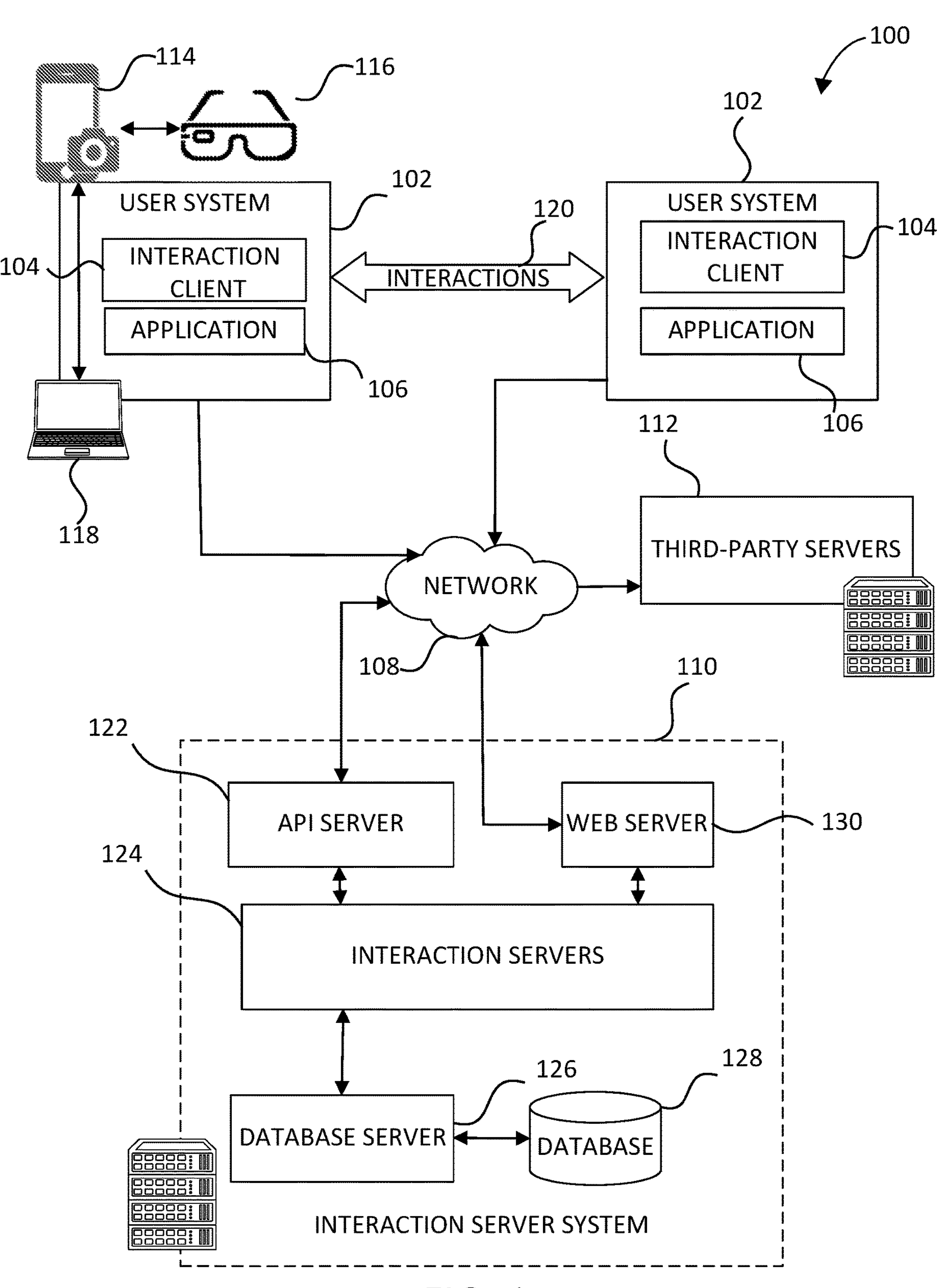
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Many applications that run on mobile devices need position information of the mobile device to provide many features of the applications. For example, many applications that provide augmented reality (AR), mixed reality (MR), virtual reality (VR), and/or extended reality (XR) require position information of the mobile device to offer many features of the applications.

A technical problem is how to determine the position information of the mobile device. In some examples, the technical problem is addressed by having a case with a larger battery to determine a position of the case and then provide information to the mobile device to enable the mobile device to determine a position the mobile device. The information from the case enables the mobile device to use less energy, which saves battery power, and enables the mobile device to determine the location more precisely. For example, the case may have a GNSS receiver component with multiple bands. The case downloads the almanac and ephemeris information for the GNSS satellites. The case then transfers this information to the mobile device using a low-power communication protocol such as low-energy Bluetooth® (BLE). The case determines the satellites for which the mobile device is most likely to be able to acquire and track the signals. Since the case is near the mobile device, the case can determine this information.

The case can then transfer information such as space vehicle identifications (SVIDs), frequency errors, the ratios of the carrier power over the noise power for a unit bandwidth (C/N), SVIDs of satellites to avoid, atmospheric delay, clock error, frequency doppler shifts, and other information. The mobile device uses this information to simplify determining the position of the mobile device using space vehicles or satellites. Additionally, the mobile device may be able to use the clock error which may reduce the number of satellites the mobile device has to use from four to three. Moreover, the information can include the position of the case, which is assumed to be near the mobile device. The mobile device can use the position of the case to improve an estimate of the location of the mobile device and to reduce the complexity of determining the position of the mobile device.

Additionally, since the mobile device is able to simplify the position operations, the GNSS receiver component may be in a standby mode or turned off mode for a longer period of time, which saves battery power and reduces the exposure to electromagnetic radiation to the user.

Another technical challenge is how to provide privacy to users of mobile devices. The technical challenge is addressed by including a case that can perform position fix operations with GNSS satellites. Since the case is close to the mobile device, the case can provide information to assist the mobile device in acquiring and tracking satellites. Additionally, the mobile device does not have to share any position information outside of the case, which is controlled by the same user of the mobile device. Moreover, since the case is close to the mobile device, the case and mobile device can exchange information using a low-energy communication protocol.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems), an interaction server system 110 and third-party servers 112). An interaction client 104 can also communicate with locally hosted applications 106 using Applications Program Interfaces (APIs).

Each user system 102 may include multiple user devices, such as a computing device 114, wearable apparatus 116, and a computer client device 118 that are communicatively connected to exchange data and messages. The wearable apparatus 116 may be a wearable apparatus 116.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
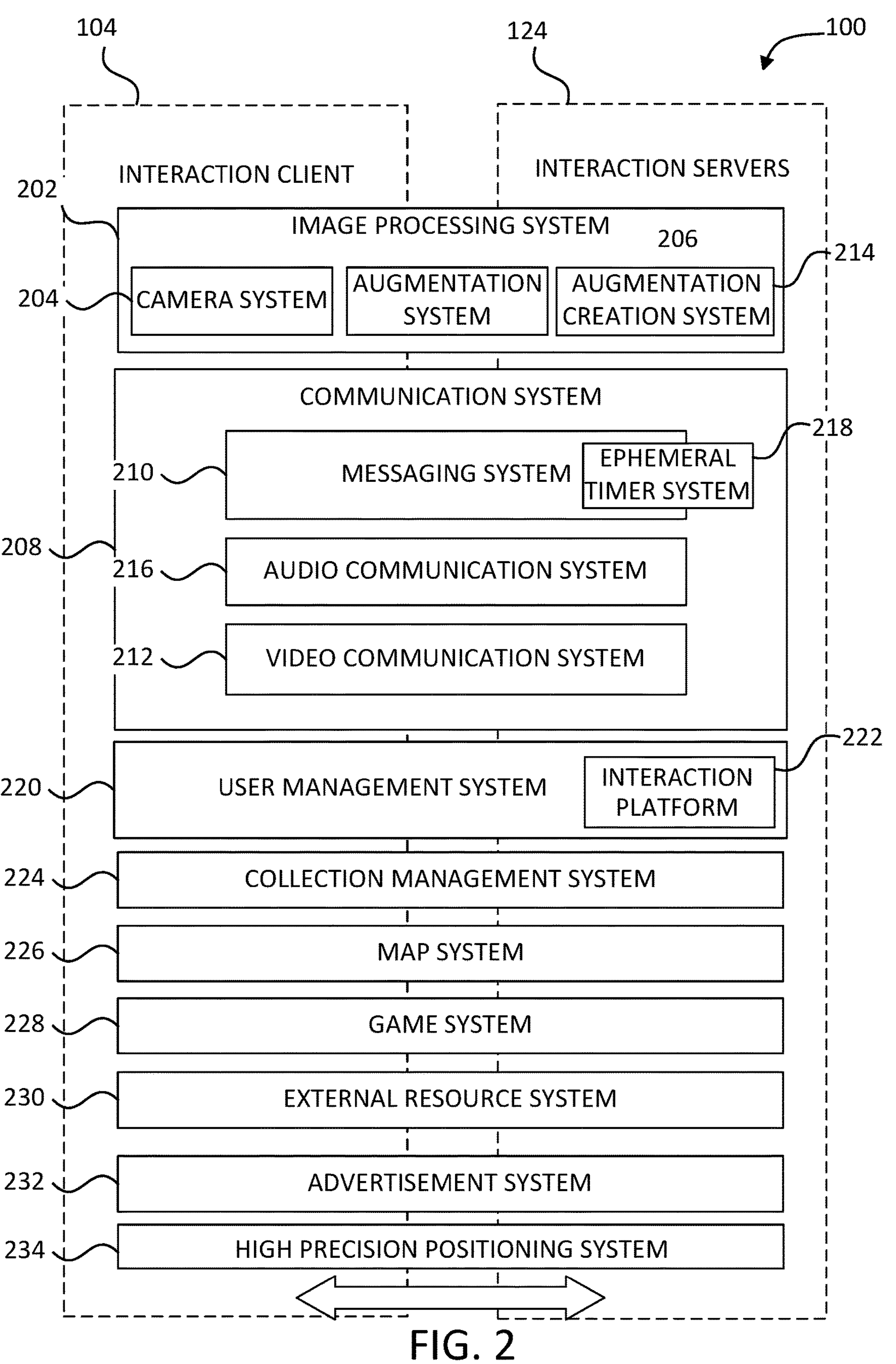
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes an interaction platform 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Figure 9:
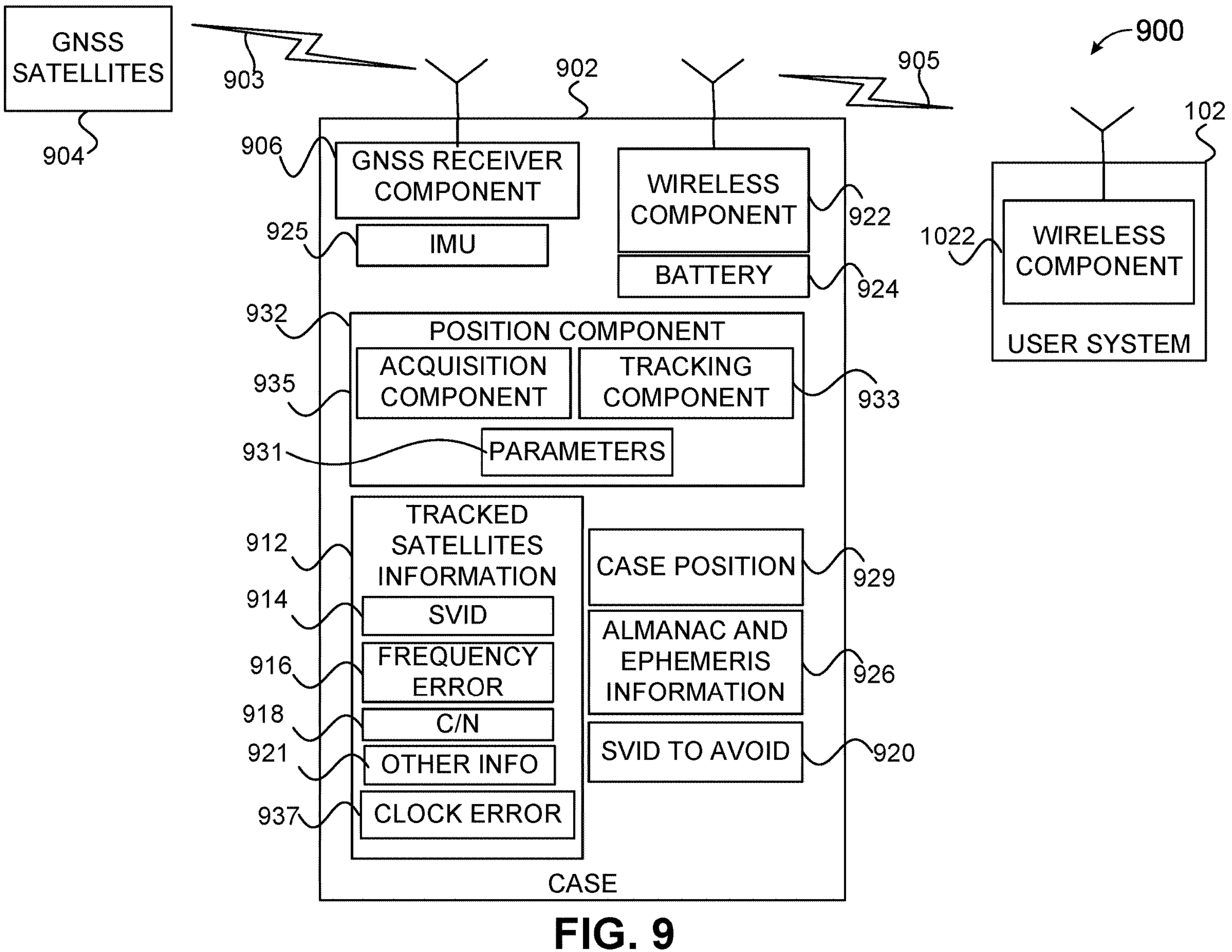
FIG. 9 illustrates a system for high precision positioning for mobile devices, in accordance with some examples.
Figure 10:
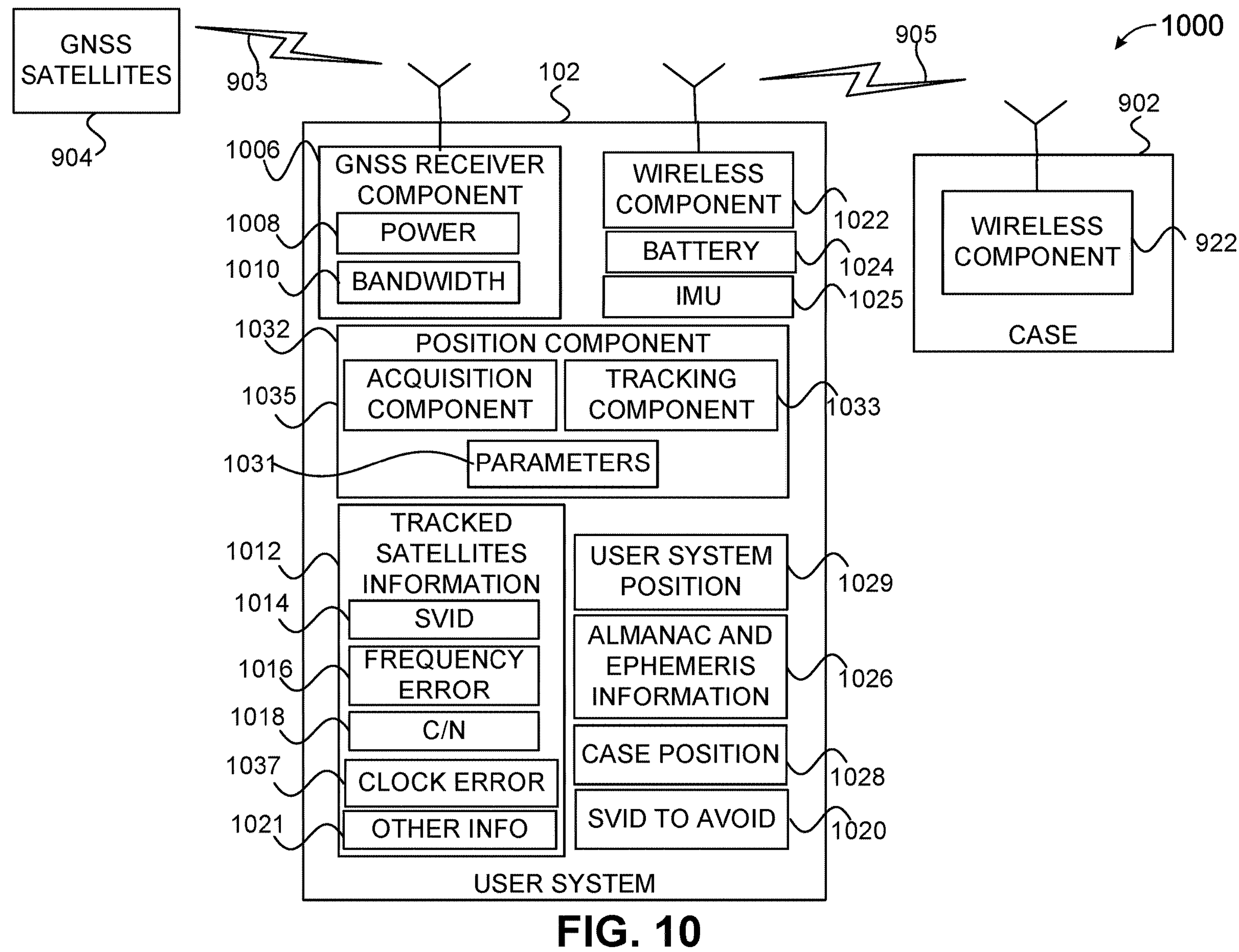
FIG. 10 illustrates a system for high precision positioning for mobile devices, in accordance with some examples.

The high-precision positioning system 234 supports, referring to FIGS. 9 and 10, the position components 932, 1032. In some examples, the high-precision positioning system 234 performs one or more functions for the positioning components 932, 1032 such as solving equations for the acquisition components 935, 1035 or tracking components 933, 1033. Additionally, the high-precision positioning system 234 may provide the almanac and ephemeris information 926 to the case 902 and/or the user system 102. Moreover, the high-precision position system 234 may provide updates and/or applications to the case 902 and/or the user system 102 such as providing the positioning components 932, 1032.

Data Architecture

Figure 3:
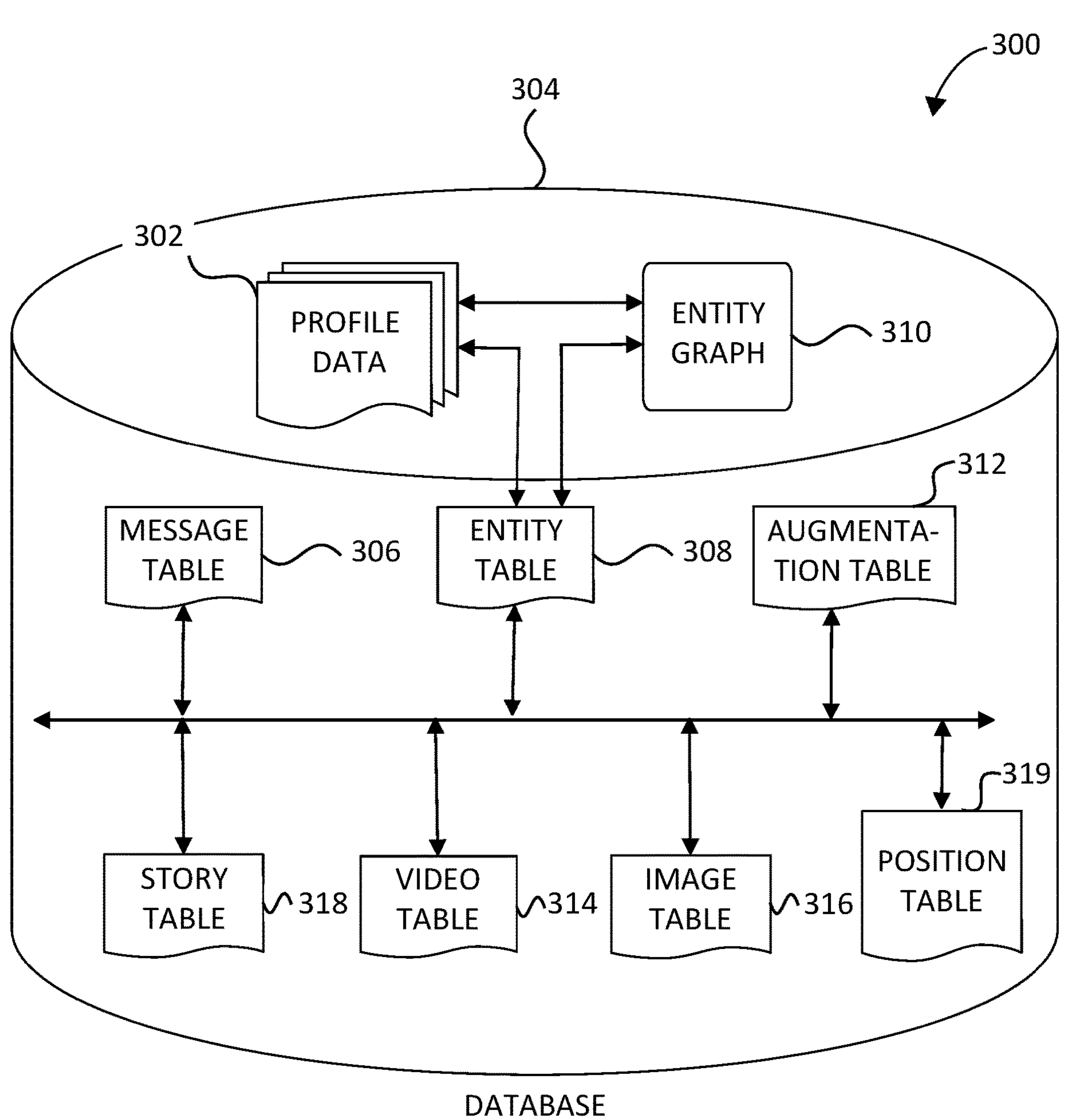
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a “friend” relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes position table 319. The position table 319 includes, referring to FIGS. 9 and 10, almanac and ephemeris information 926, 1026, user system position 1029, case position 929, 1028, and so forth.

Data Communications Architecture

Figure 4:
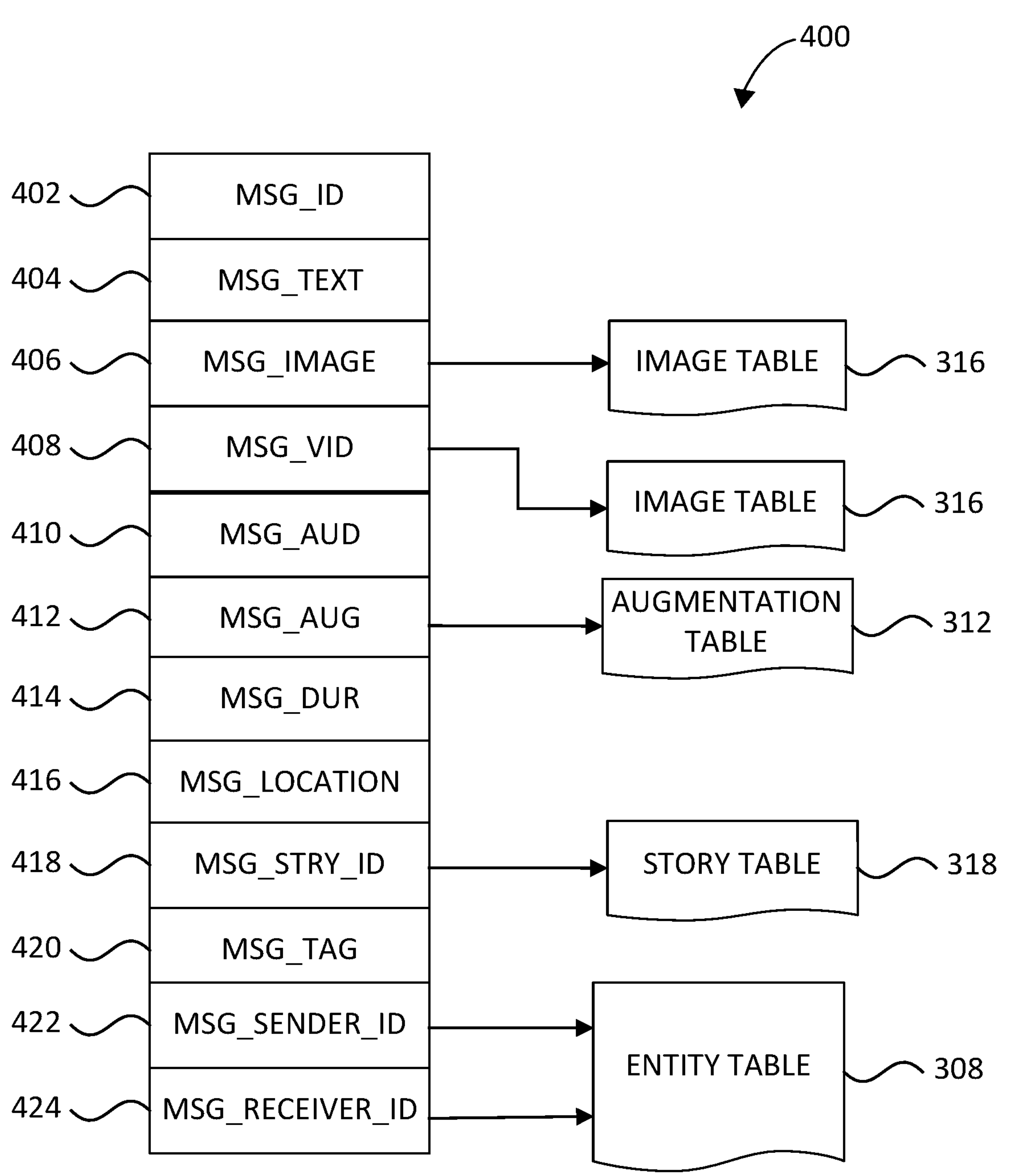
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402 is a unique identifier that identifies the message 400.
- Message text payload 404 is text, to be generated by a user via a user interface of the user system 102, and that is included in the message 400.
- Message image payload 406 is image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.

- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414 is a parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

System With Wearable Apparatus

Figure 5:
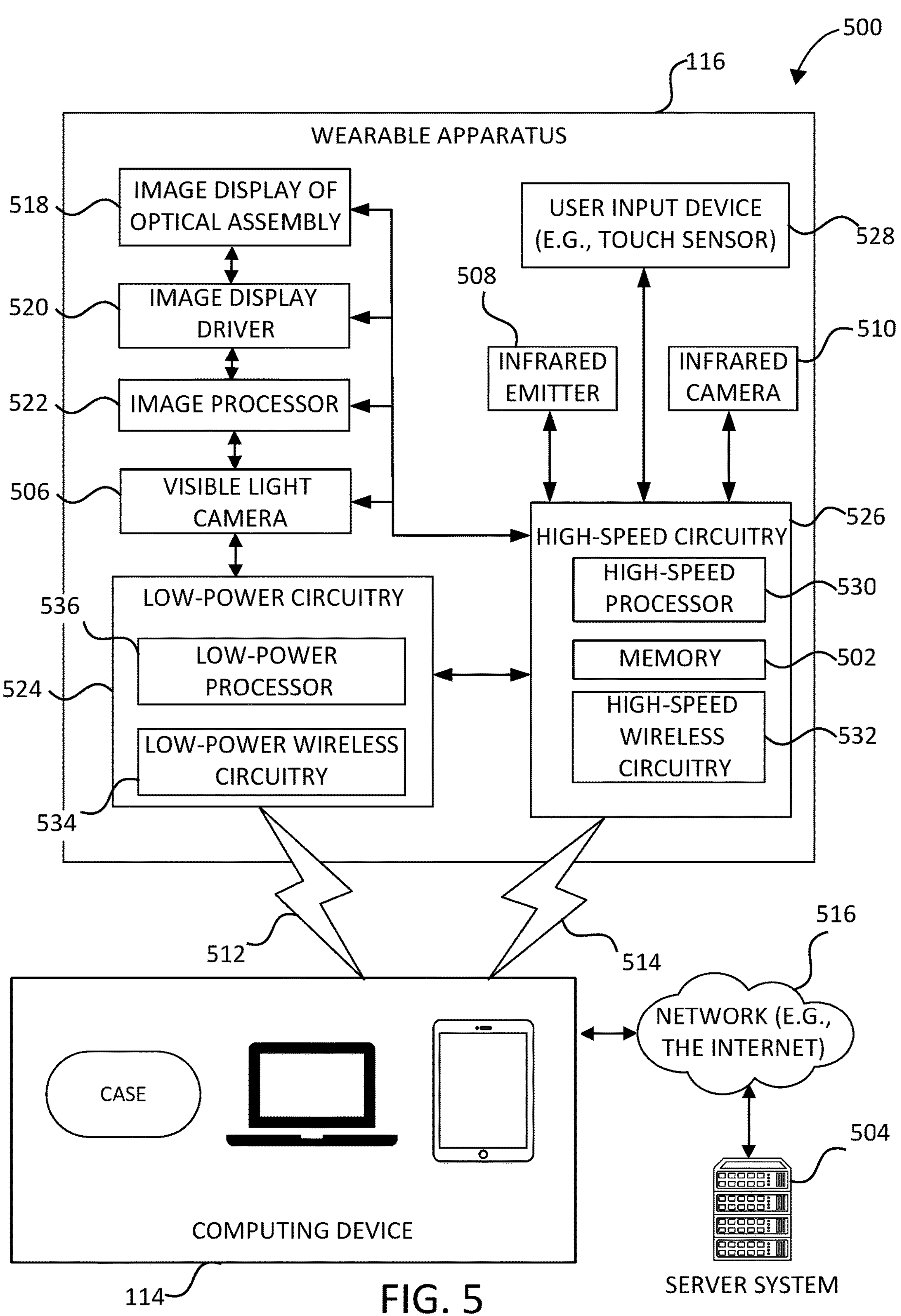
FIG. 5 illustrates a system in which the wearable apparatus, according to some examples.

FIG. 5 illustrates a system 500 including a wearable apparatus 116 with a selector input device, according to some examples. FIG. 5 is a high-level functional block diagram of an example wearable apparatus 116 communicatively coupled to a computing device 114 and various server systems 504 (e.g., the interaction server system 110) via various networks 108.

The wearable apparatus 116 includes one or more cameras, each of which may be, for example, a visible light camera 506, an infrared emitter 508, and an infrared camera 510.

The computing device 114 connects with wearable apparatus 116 using both a low-power wireless connection 512 and a high-speed wireless connection 514. The computing device 114 is also connected to the server system 504 and the network 516, in accordance with some examples. The computing device 114 may be a portable computing device such as a smart phone, tablet, laptop, or another type of computing device 114 such as a desktop computer, or another type of computing device 114.

The wearable apparatus 116 further includes two image displays of the image display of optical assembly 518. The two image displays of optical assembly 518 include one associated with the left lateral side and one associated with the right lateral side of the wearable apparatus 116. The wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The wearable apparatus 116 includes a frame and stems (or temples) extending from a lateral side of the frame. The wearable apparatus 116 further includes a user input device 528 (e.g., touch sensor or push button), including an input surface on the wearable apparatus 116. The user input device 528 (e.g., touch sensor or push button) is to receive from the user an input selection to manipulate the graphical user interface of the presented image.

The components shown in FIG. 5 for the wearable apparatus 116 are located on one or more circuit boards, for example a PCB or flexible PCB, in the rims or temples. Alternatively, or additionally, the depicted components can be located in the chunks, frames, hinges, or bridge of the wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the wearable apparatus 116, and the operating system is stored in the memory 502 for execution. In addition to any other responsibilities, the high-speed processor 530 executing a software architecture for the wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the wearable apparatus 116 can include short-range transceivers (Bluetooth™) and wireless wide, local, or wide area network transceivers (e.g., cellular or WiFi). Computing device 114, including the transceivers communicating via the low-power wireless connection 512 and the high-speed wireless connection 514, may be implemented using details of the architecture of the wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the wearable apparatus 116 can be coupled to the camera (visible light camera 506, infrared emitter 508, or infrared camera 510), the image display driver 520, the user input device 528 (e.g., touch sensor or push button), and the memory 502.

The wearable apparatus 116 is connected to a host computer. For example, the wearable apparatus 116 is paired with the computing device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the computing device 114 and the wearable apparatus 116.

The computing device 114 includes a processor and a network communication interface coupled to the processor. The network communication interface allows for communication over the network 516, low-power wireless connection 512, or high-speed wireless connection 514. Computing device 114 can further store at least portions of the instructions for generating binaural audio content in the computing device 114's memory to implement the functionality described herein.

Output components of the wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the wearable apparatus 116 further include acoustic components (e.g., speakers), haptic components (e.g., a vibratory motor), other signal generators, and so forth. The input components of the wearable apparatus 116, the computing device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The wearable apparatus 116 may also include additional peripheral device elements. Such peripheral device elements may include biometric sensors, additional sensors, or display elements integrated with the wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the computing device 114 via the low-power wireless circuitry 534 or high-speed wireless circuitry 532.

Machine Architecture

Figure 6:
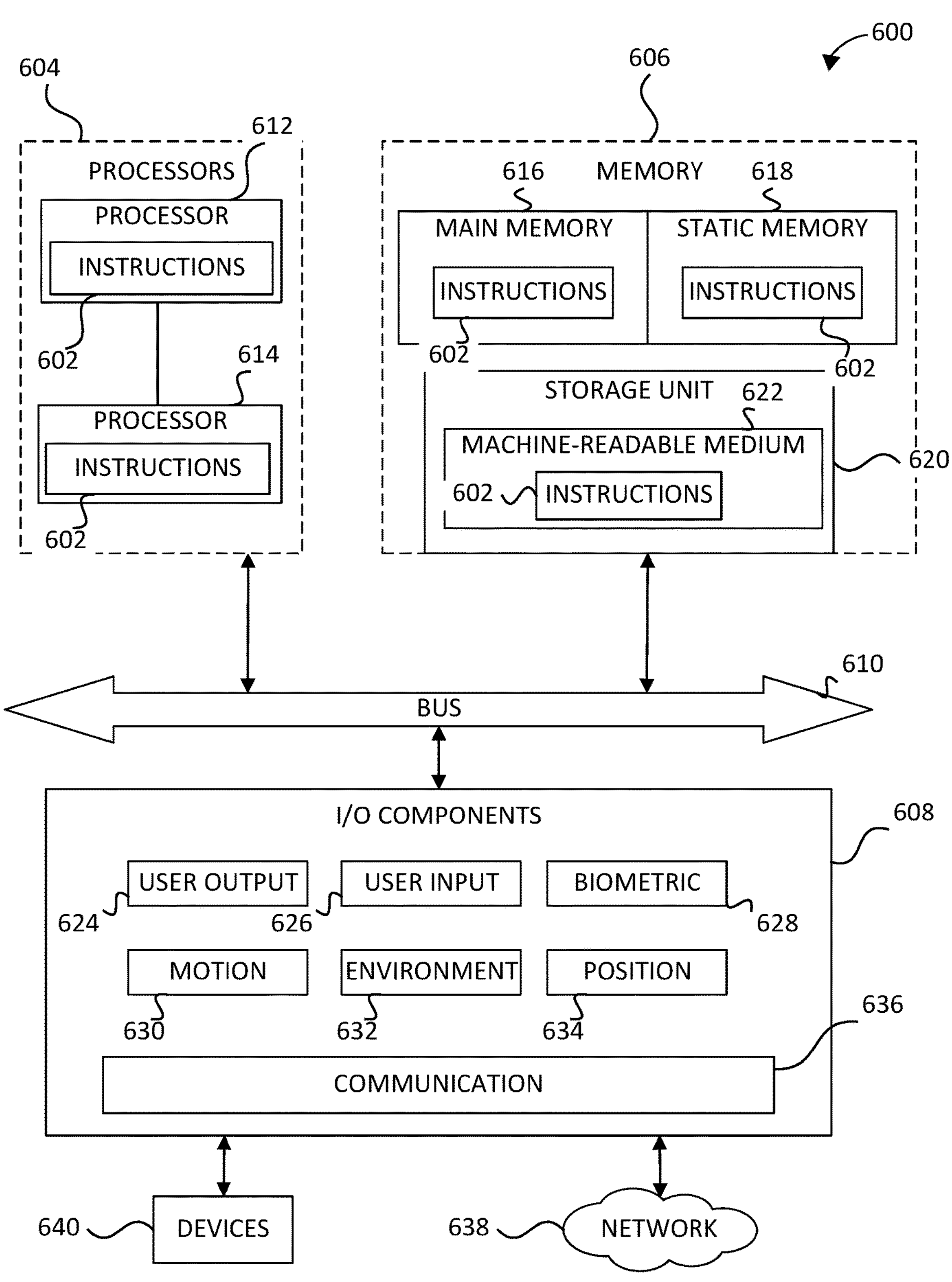
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system 102 or any one of multiple server devices forming part of the interaction server system 110. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
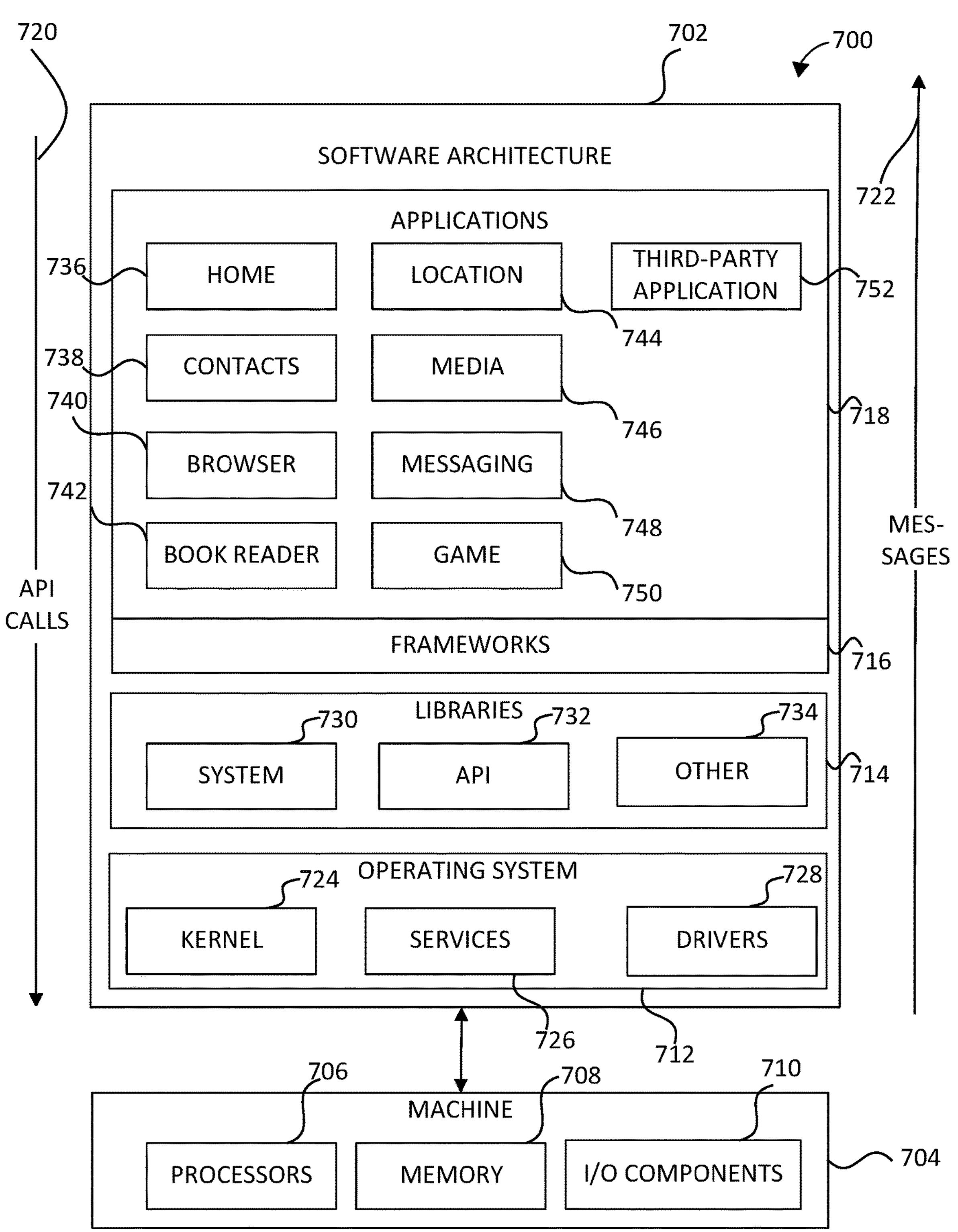
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

Figure 8:
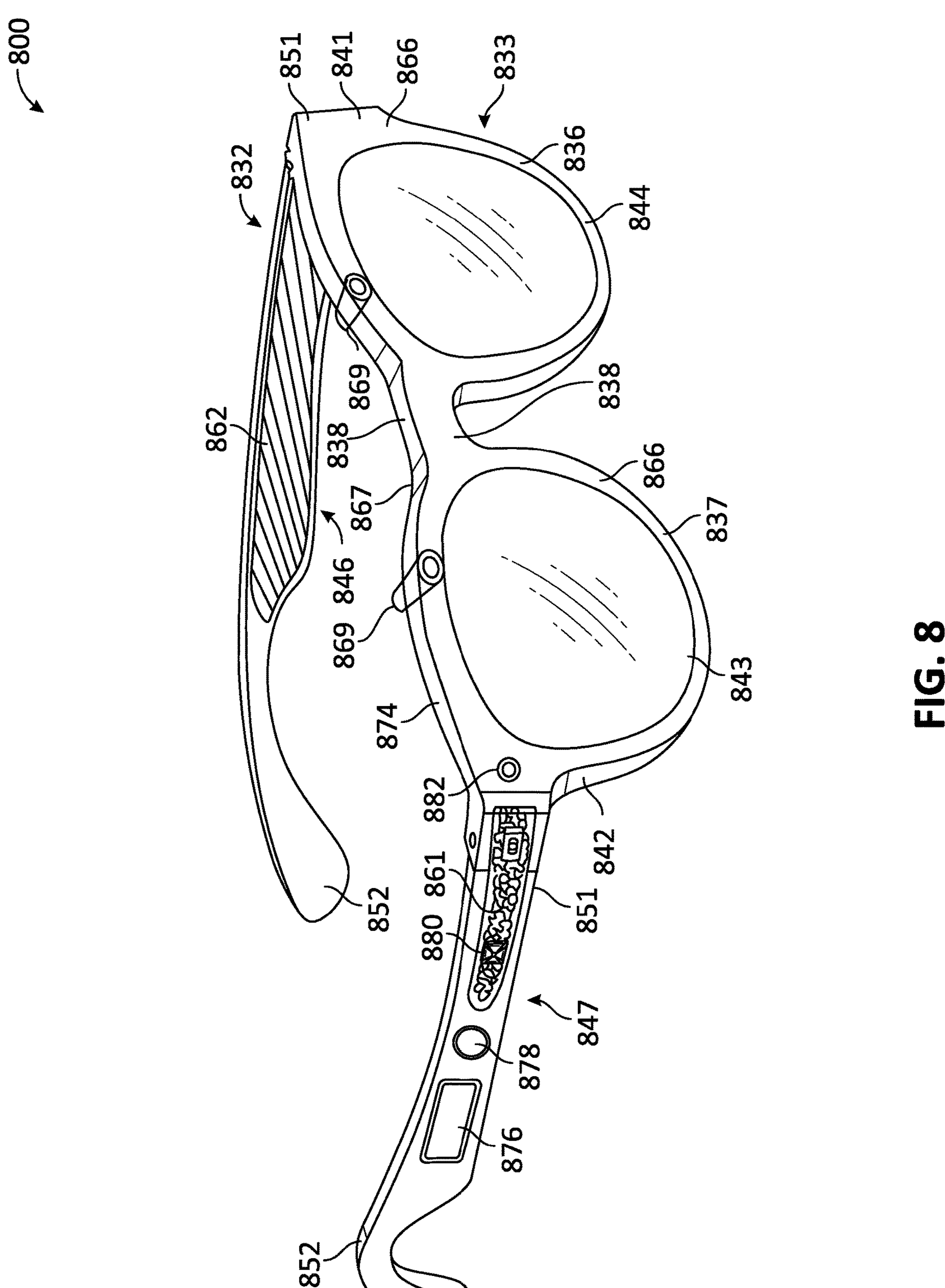
FIG. 8 is a perspective view of a wearable apparatus in the form of glasses, in accordance with some examples.

FIG. 8 is a perspective view of a wearable apparatus in the form of glasses 800, in accordance with some examples. The glasses 800 are an article of eyewear including electronics, which operate within a network system for communicating image and video content. FIG. 8 illustrates an example of the wearable apparatus 116. In some examples, the wearable electronic device is termed augmented reality (AR), mixed reality (MR), virtual reality (VR), and/or extended reality (XR) glasses. The glasses 800 can include a frame 832 made from any suitable material such as plastic or metal, including any suitable shape memory alloy. The frame 832 can have a front piece 833 that can include a first or left lens, display, or optical element holder 836 and a second or right lens, display, or optical element holder 837 connected by a bridge 838. The front piece 833 additionally includes a left end portion 841 and a right end portion 842. A first or left optical element 844 and a second or right optical element 843 can be provided within respective left and right optical element holders 836, 837. Each of the optical elements 843, 844 can be a lens, a display, a display assembly, or a combination of the foregoing. In some examples, for example, the glasses 800 are provided with an integrated near-eye display mechanism that enables, for example, display to the user of preview images for visual media captured by cameras 869 of the glasses 800.

The frame 832 additionally includes a left arm or temple piece 846 and a right arm or temple piece 847 coupled to the respective left and right end portions 841, 842 of the front piece 833 by any suitable means such as a hinge (not shown), so as to be coupled to the front piece 833, or rigidly or fixedly secured to the front piece 833 so as to be integral with the front piece 833. Each of the temple pieces 846 and 847 can include a first portion 851 that is coupled to the respective end portion 841 or 842 of the front piece 833 and any suitable second portion 852, such as a curved or arcuate piece, for coupling to the ear of the user. In one example, the front piece 833 can be formed from a single piece of material, so as to have a unitary or integral construction. In one example, the entire frame 832 can be formed from a single piece of material so as to have a unitary or integral construction.

The glasses 800 include a computing device, such as a computer 861, which can be of any suitable type so as to be carried by the frame 832 and, in one example, of a suitable size and shape, so as to be at least partially disposed in one or more of the temple pieces 846 and 847. In one example, the computer 861 has a size and shape similar to the size and shape of one of the temple pieces 846, 847 and is thus disposed almost entirely if not entirely within the structure and confines of such temple pieces 846 and 847.

In one example, the computer 861 can be disposed in both of the temple pieces 846, 847. The computer 861 can include one or more processors with memory, wireless communication circuitry, and a power source. The computer 861 comprises low-power circuitry, high-speed circuitry, location circuitry, and a display processor. Various other examples may include these elements in different configurations or integrated together in different ways. Additional details of aspects of the computer 861 may be implemented as described with reference to the description that follows.

The computer 861 additionally includes a battery 862 or other suitable portable power supply. In one example, the battery 862 is disposed in one of the temple pieces 846 or 847. In the glasses 800 shown in FIG. 8, the battery 862 is shown as being disposed in the left temple piece 846 and electrically coupled using a connection 874 to the remainder of the computer 861 disposed in the right temple piece 847. One or more input and output devices can include a connector or port (not shown) suitable for charging a battery 862 accessible from the outside of the frame 832, a wireless receiver, transmitter, or transceiver (not shown), or a combination of such devices.

The glasses 800 include digital cameras 869. Although two cameras 869 are depicted, other examples contemplate the use of a single or additional (i.e., more than two) cameras 869. For ease of description, various features relating to the cameras 869 will be described further with reference to only a single camera 869, but it will be appreciated that these features can apply, in suitable examples, to both cameras 869.

In various examples, the glasses 800 may include any number of input sensors or peripheral devices in addition to the cameras 869. The front piece 833 is provided with an outward-facing, forward-facing, front, or outer surface 866 that faces forward or away from the user when the glasses 800 are mounted on the face of the user, and an opposite inward-facing, rearward-facing, rear, or inner surface 867 that faces the face of the user when the glasses 800 are mounted on the face of the user. Such sensors can include inward-facing video sensors or digital imaging modules such as cameras 869 that can be mounted on or provided within the inner surface 867 of the front piece 833 or elsewhere on the frame 832 so as to be facing the user, and outward-facing video sensors or digital imaging modules such as the cameras 869 that can be mounted on or provided with the outer surface 866 of the front piece 833 or elsewhere on the frame 832 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 843, 844 (or lenses) to provide a mixed reality or augmented reality experience for the user of the glasses 800.

The glasses 800 further include an example of a camera control mechanism or user input mechanism comprising a camera control button mounted on the frame 832 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 832 adjacent to its surface for detecting the presence of a user's finger, to dispose the touch-sensitive button to the engaged condition when the user touches a finger to the corresponding spot on the outer surface 866 of the frame 832. It will be appreciated that the above-described camera control button and capacitive touch button are but two examples of a haptic input mechanism for single-action control of the camera 869, and that other examples may employ different single-action haptic control arrangements.

The computer 861 is configured to perform the methods described herein. In some examples, the computer 861 is coupled to one or more antennas for reception of signals from a GNSS and circuitry for processing the signals where the antennas and circuitry are housed in the glasses 800. In some examples, the computer 861 is coupled to one or more wireless antennas and circuitry for transmitting and receiving wireless signals where the antennas and circuitry are housed in the glasses 800. In some examples, there are multiple sets of antennas and circuitry housed in the glasses 800. In some examples, the antennas and circuitry are configured to operate in accordance with a communication protocol such as Bluetooth™, Low-energy Bluetooth™, IEEE 802, IEEE 802.11az/be, WiFI®, and so forth. In some examples, PDR sensors housed in glasses 800 and coupled to the computer 861. In some examples, the glasses 800 are VR headsets where optical elements 843, 844 are opaque screens for displaying images to a user of the VR headset. In some examples, the computer 861 is coupled to user interface elements such as slide or touchpad 876 and button 878. A long press of button 878 resets the glasses 800. The slide or touchpad 876 and button 878 are used for a user to provide input to the computer 861 and/or other electronic components of the glasses 800. The glasses 800 include one or more microphones 882 that are coupled to the computer 861. The glasses 800 include one or more gyroscopes 880.

High Precision Positioning for Mobile Devices

FIG. 9 illustrates a system 900 for high precision positioning for mobile devices, in accordance with some examples. FIG. 10 illustrates a system 1000 for high precision positioning for mobile devices, in accordance with some examples. FIGS. 9 and 10 are disclosed in conjunction with one another. The global navigation satellite system (GNSS) satellites 904 provide signals that are received by the GNSS receiver component 906 of the case 902 and the GNSS receiver component 1006 of the user system 102. The GNSS satellites 904 provides autonomous geo-positioning information. Examples of the GNSS satellites 904 includes the United States' Global Positioning System (GPS), the European Union's Galileo system, and so forth. The signals 903 of the GNSS satellites 904 include information that can be used to determine a distance to the GNSS satellites 904. The information may include an SVID 914, 1014 of the GNSS satellite 904, an indication of a time of a clock, almanac and ephemeris information 926, 1026, and so forth. The position component 932 and position component 1032 can determine a case position 929 and user system position 1029, respectively, by acquiring the signals 903 of a plurality of GNSS satellites 904 and determining a distance from the GNSS satellites 904 and a location of the GNSS satellites 904 based on using information encoded in the signals 903.

In some examples, three GNSS satellites 904 are used to triangulate the case position 929 or the user system position 1029 and a fourth GNSS satellite 904 is used to determine a clock error 937. The almanac and ephemeris information 926, 1026 include information to calculate the position of each GNSS satellite 904 in orbit, and information about the time and status of entire satellite constellations. The case 902 and user system 102 may select different GNSS satellite 904 constellations, or groups of GNSS satellites 904, in accordance with some examples to determine the case position 929 and user system position 1029, respectively.

In some examples, the GNSS receiver component 906, 1006 include processing circuitry, transceiver circuitry, a memory, and one or more antennas. In some examples, the GNSS receiver component 906 includes a dual band L1 and L5 GNSS receiver. The dual band L1 and L5 GNSS receiver is configured to resolve multi-path effects, atmospheric transmission effects distorting GNSS location computations, and so forth. In some examples, the GNSS receiver component 1006 is a single band L1 GNSS receiver, which may require less power 1008 than the dual band L1 and L5 GNSS receiver.

The wireless component 922 and wireless component 1022 include processing circuitry, transceiver circuitry, a memory, and one or more antennas. The wireless component 922 and wireless component 1022 are configured to communicate with one another using a communications protocol such as Bluetooth®, low-energy Bluetooth® (BLE), another Institute for Electrical and Electronic Engineers (IEEE) 802.11 communication protocol, or another communication protocol.

In some examples, the GNSS receiver component 906 and the wireless component 922 are configured to communicate with one another using serial peripheral interface (SPI) and/or Inter-Integrated Circuit (I2C). In some examples, the GNSS receiver component 1006 and the wireless component 1022 are configured to communication with one another using SPI and/or I2C.

The functions described herein as being performed by the case 902 and the user system 102 may be performed by one or more of the GNSS receiver component 906, 1006, wireless component 922, 1022, or the position component 932, 1032, respectively. For example, an acquisition procedure may be performed by the GNSS receiver component 906, 1006, or the position component 932, 1032.

The user system 102 may be user system 102 as disclosed in conjunction with FIG. 1, wearable apparatus 116 as disclosed in conjunction with FIG. 5, and/or glasses 800 as disclosed in conjunction with FIG. 8. The case 902 may communicate with the user system 102 as disclosed in conjunction with FIG. 5 where the user system 102 is a wearable apparatus 116. A user of the user system 102 may want to use applications that request the user system position 1029 frequently.

The case 902 performs a location fix operation and transfers information such as the tracked satellites information 912, almanac and ephemeris information 926, the case position 929, and/or a clock error 937 to the user system 102. The case 902 transmits the information to the user system 102 using the wireless component 922 and is intended to reduce the power and/or time required for the user system 102 to determine the user system position 1029. Additionally, the information the case 902 transmits to the user system 102 may enable the user system 102 to determine the user system position 1029 more precisely.

The tracked satellite information 912 includes space vehicle identification (SVID) 914, frequency error 916, the ratio of the carrier power over the noise power for a unit bandwidth (C/N) 918, other information 921, and SVIDs to avoid 920, which indicates one or more satellites to avoid. The other information 921 includes atmospheric delay, frequency doppler, and so forth. For example, the case 902 may determine the best SVIDs 914, the frequency error 916, the C/N 918, SVIDs to avoid 918, clock error 937, case position 929, and/or almanac and ephemeris information 926 and transfer the information to the user system 102 via the wireless component 922. The tracked satellite information 912 may be per GNSS satellite 904 that is indicated by the SVID 914. For example, there may be a clock error 937 for each GNSS satellite 904.

The case 902 periodically updates the information and transfers the information to the user system 102 when the user system 102 is being used. The case 902 may determine when to transfer the information based on the case position 929 changing more than or transgressing a threshold distance. The battery 924 of the case 902 is larger than the battery 1024 of the user system 102, which enables the case 902 to perform more position fix operations. Additionally, the user system 102 may be glasses 800 which are near a head of user so that it may be better to enable the user system 102 to reduce the energy and power used to reduce the exposure of the head of the user to heat.

The position component 932, which may be embodied in the GNSS receiver component 906, determines the tracked satellites information 912, case position 929, almanac and ephemeris information 926, case position 928, and clock error 937. For example, the position component 932 may perform a fix operation, which includes an acquisition component 935 and tracking component 933 to determine the case position 929 and other information. The parameters 931 are parameters used by the acquisition component 935 and the tracking component 933. The position component 932 determines the SVIDs 914 of GNSS satellites 904, which may be termed space vehicles, to use to determine the case position 929. In some examples, the position component 932 determines SVIDs 914 and other information that would be better for the user system 102 to use rather than the case 902.

For example, the position component 932 may determine the case position 929 using the strongest signals 903 for a dual band L1 and L5 GNSS receiver and determine the SVIDs 914 and other information that is best for an L1 GNSS receiver used by the user system 102. The position components 932, 1032 control the GNSS receiver components 906, 1006, respectively, in accordance with some examples.

The user system 102 receives, via wireless component 1022, the information from the case 902 such as tracked satellites information 1012, SVIDs 1014, frequency error 1016, C/N 1018, SVID to avoid 1020, almanac and ephemeris information 1026, case position 1028, other information 1021, and clock error 1037. Other information 921 may include atmospheric delay, frequency doppler, and so forth. The user system 102 refrains from acquiring the signals from the GNSS satellites 904 corresponding to the SVIDs to avoid 1020.

The user system 102 uses the information to determine the user system position 1029 based on the signals 903 and the information. The information may make it easier for the user system 102 to determine the user system position 1029. In some examples, the position component 1032 begins a position fix operation to determine the user system position 1029 by performing an acquisition procedure using the acquisition component 1035 to acquire the signals 903 of the GNSS satellite 904 corresponding to the SVID 1014.

The parameters 1031 are parameters used by the acquisition component 1035 and the tracking component 1033. The parameters 1031 include the information received from the case 902. The acquisition component 1035 performs an acquisition procedure to acquire the signals 903 of a GNSS satellite 904. The tracking component 1033 tracks the acquired GNSS satellite 904. To determine the user system position 1029 three or four GNSS satellites 904 need to be acquired and tracked.

There may be different constellations of GNSS satellites 904 that the user system 102 could choose from. The SVIDs 1014 indicate GNSS satellites 904 and thus the constellation the user system 102 should use.

The clock error 1037 may enable the user system 102 to reduce the number of GNSS satellites 904 that have to be acquired and tracked by providing the clock error 1037, which enables the user system 102 to determine a time of an atomic clock used by the GNSS satellites 904, and which is encoded in the signals 903. Having to acquire and track fewer GNSS satellites 904, enables the user system 102 to determine the user system position 1029 faster and using less energy. The clock error 1037 and frequency error 1016 from the case 902 enable the position component 1032 to determine the user position 1029 more accurately compared with using a standalone L1 receiver.

The acquisition component 1035 starts by using the frequency error 1016 provided by the case 902 as a starting point to acquire a corresponding GNSS satellite 904 indicated by the SVID 1014. Using the frequency error 1016 reduces a frequency search window for the acquiring procedure used by the acquisition component 1035. The frequency error 1016 is a parameter 1031 for the acquisition component 1035.

Additionally, the acquisition component 1035 may use the C/N 1018 provided by the case 902. For example, if a value of SVID 1014 is "2", which indicates a particular GNSS satellite 904, and a value of a corresponding C/N 1018 for the GNSS satellite 904 indicated by the SVID 1014 is a higher value, then the acquisition component 1035 updates a parameter 1031 for the acquisition procedure, which may be called an acquisition loop, and uses a smaller integration time, e.g., 250 μS, for getting a frequency lock on the signals 903 of the GNSS satellite 904 and then getting a code lock on the encoded signals 903 of the GNSS satellite 904. The frequency lock and code lock indicate that the acquisition component 1035 has the frequency of the GNSS satellite 904 and is able to decode signals that are encoded in the signals 903 such as a transmission time of the signals 903.

In another example, if a value of SVID 1014 is "5" and a value of a corresponding C/N 1018 is a lower value, then the acquisition component 1035 updates the parameters 1031 for the acquisition procedure and uses a longer integration time, e.g., 1 mS, to get a frequency lock and a code lock on the signals 903. In some examples, the integration time may be varied from 100 microseconds to 3 milliseconds, or other durations.

The search time for the GNSS satellite 904 with a value of "2" for SVID 1014 would then be one-quarter the time for the GNSS satellite 904 with a value of "5" for SVID 1014. The savings in time is due to being provided the C/N 1018 values for the GNSS satellites 904 by the case 902, which is assumed to be close to the user system 102.

The almanac and ephemeris information 1026, which may be needed to perform the acquisition procedure and the tracking procedure, for the GNSS satellites 904 can be transferred to the user system 102 over the wireless component 905 prior to the start of the acquisition procedure performed by the acquisition component 1035. The user system 102 then need not use the GNSS receiver component 1006 to down load the almanac and ephemeris information 1026. Additionally, this may reduce the time to determine the user system position 1029 and may save energy as the energy used by the GNSS receiver component 1006 is greater than the energy used by the wireless component 1022, in accordance with some examples.

In some examples, the use of the information from the case 902 enables the tracking component 1033 to reduce the bandwidth 1010 to 0.05 Hz or another value between 0.01 Hz and 0.10 Hz. The reduced bandwidth 1010 is enabled by the greater accuracy of the user acquisition component 1035 when it uses information such as the frequency error 1016 and C/N 1018 for a GNSS satellite 904. The reduced bandwidth 1010, which may indicate a tuning or focus of the GNSS receiver component 1006, reduces the power 1008 the GNSS receiver component 1006 requires. The lower power 1008 usage extends the usage of the battery 1024 before it has to be recharged.

The SVIDs to avoid 1020 are IDs of GNSS satellites 904 whose multipath effects are stronger. The time to acquire the GNSS satellites 904 whose multipath effects are stronger is greater and requires more energy. Additionally, since the case 902 is near the user system 102 the tracked satellite information 1012 will be similar for the user system 102 and case 902.

The information from the case 902 enables the user system 102 to determine the user system position 1029 more quickly so the user system 102 can reduce the power to or turn off the power 1008 to the GNSS receiver component 1006, which conserves the battery 1024.

The user system 102 can communicate with the case 902 securely and exchange information regarding the location of the user system 102 with the case 902 without the user system position 1029 being shared outside of the case 902. The user system 102 using the case 902 for assisting the user system 102 in determining the user system position 1029 does not expose the user system 102 to tracking of the user system position 1029. Often, services that assist user systems 102 in determining the user system position 1029 require at least an approximate location of the user system 102.

The user system 102 may send messages to the case 902 requesting the information and the case 902 may proactively send the information to the user system 102. In some examples, the case 902 and/or the user system 102 includes an inertial measure unit (IMU) 925, 1025, respectively. The position components 932, 1032 may use the IMUs 925, 1025 to adjust the case position 929 or user system position 1029, respectively, when the case 902 or user system 102 is moved a smaller distance such as one meter or less. Additionally, the position components 932, 1023 may use the IMUs 925, 1025 to determine whether to perform a new position fix to determine a new case position 929 or new user system position, respectively, and/or to determine whether to turn on the GNSS receiver components 906, 1006. For example, the user system 102 may turn off the power 1008 off for the GNSS receiver component 1006 and turn the power 1008 on if the output of the IMU 1025 indicates that the user system 102 has moved more than or transgressed a threshold distance.

Figure 11:
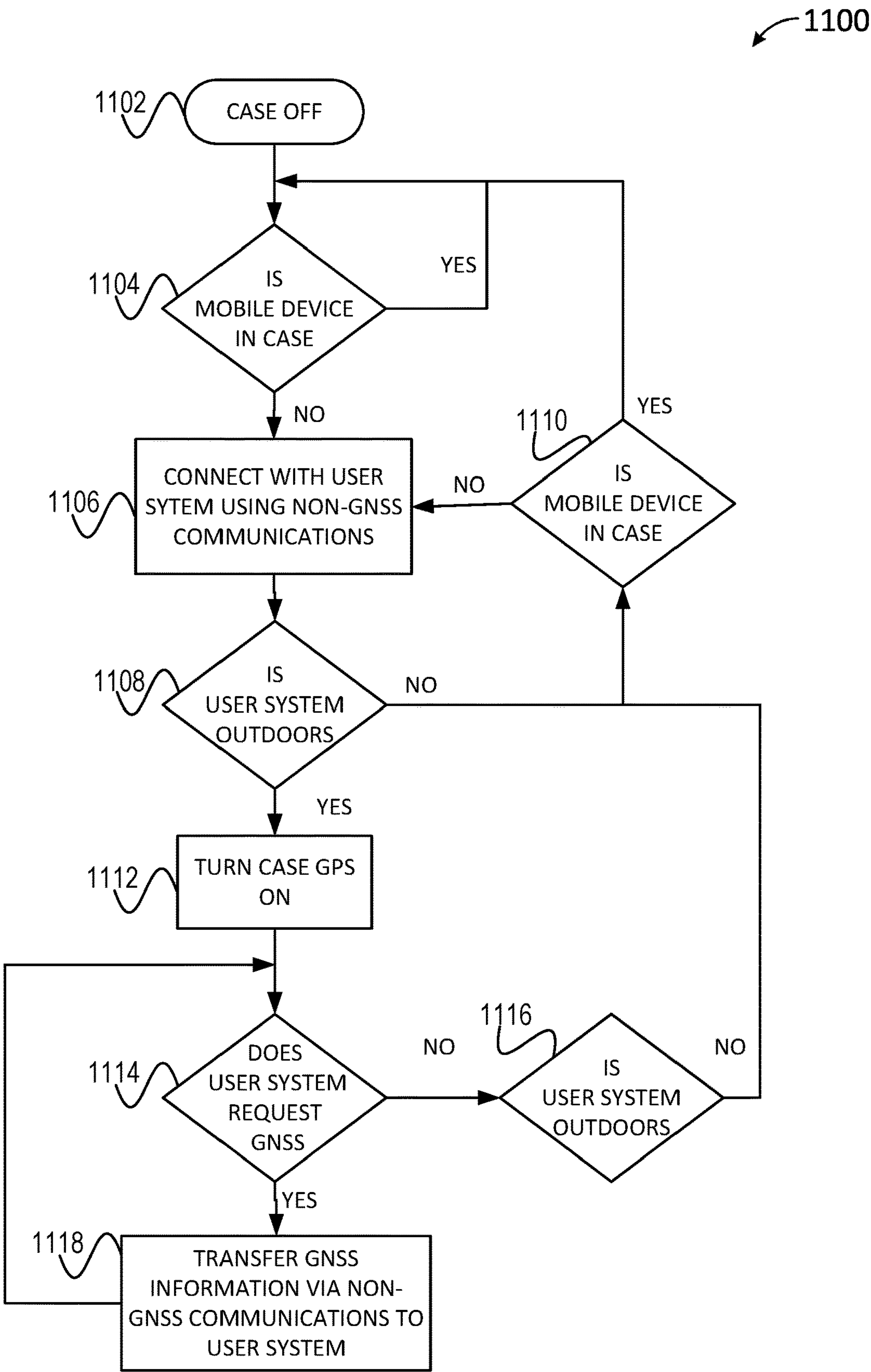
FIG. 11 illustrates a method for high precision positioning for mobile devices, in accordance with some examples.

FIG. 11 illustrates a method 1100 for high precision positioning for mobile devices, in accordance with some examples. The method 1100 begins at operation 1102 with the case being off. For example, case 902 is in an off state. The method 1100 continues at operation 1104 with "is the mobile device in the case?". For example, the user system 102 may be in or out of its case 902. The case 902 stays off as long as the user system 102 is in the case 902, in accordance with some examples.

When the user system 102 is removed from the case 902, then the method 1100 continues to operation 1106 with connecting with user system using non-GNSS communications. For example, the case 902 may automatically come on when opened. The user system 102 may be taken out by a user, and the wireless component 922 of the case 902 may connect via signals 905 with the wireless component 1022 of the user system 102 using low-energy Bluetooth® (BLE).

The method 1100 continues at operation 1108 with "is user system outdoors?". For example, the user system 102 may determine whether it is outdoors based on a reception from the GNSS receiver component 1006. If there is adequate reception, then the user system 102 may determine that it is outdoors.

The method 1100 continues at operation 1112 with "turn case GPS on". For example, the case 902 turns on its GNSS receiver component 906. The method 1100 continues at operation 1114 with "does user system request GNSS information?". If the user system does not request GNSS information, then the method 1100 continues to operation 1116 with checking again to see if the user system is outdoors. If the user system is not outdoors, then the method 1100 continues at operation 1110 with determining if the mobile device is in the case.

If the user system does request GNSS information, then the method 1100 continues to operation 1118 with transferring GNSS information via non-GNSS communication to the user system. For example, the case 902 determines the case position 929, the tracked satellite information 912, the almanac and ephemeris information 926, and the SVIDs to avoid 920. The information is transferred to the user system 102 via the wireless component 922, which may use low-energy Bluetooth®. The case 902 may additionally transfer the information to the user system 102 without a request from the user system 102 to receive the information. For example, the case 902 may query the user system 102 to determine whether the user system 102 would like the information transmitted to the user system 102.

Figure 12:
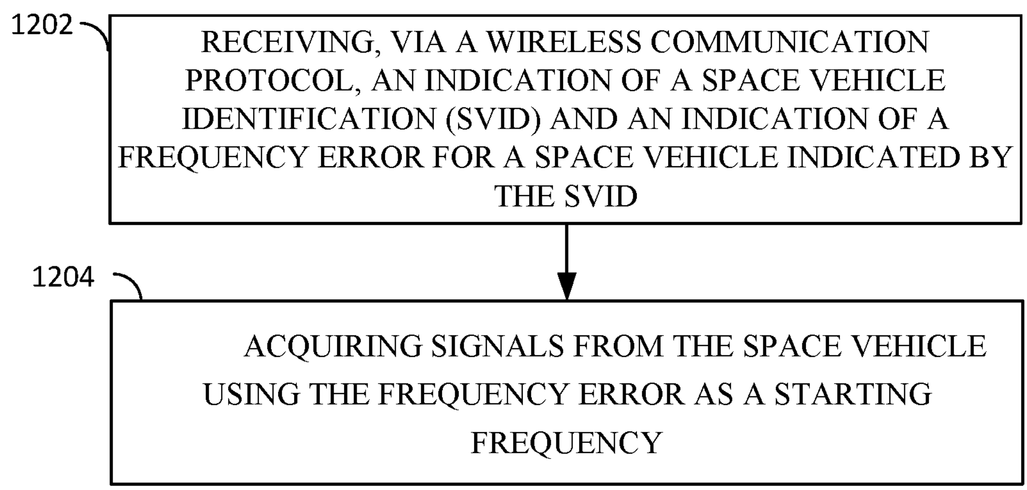
FIG. 12 illustrates a method for high precision positioning for mobile devices, in accordance with some examples.

FIG. 12 illustrates a method 1200 for high precision positioning for mobile devices, in accordance with some examples. The method 1200 begins at operation 1202 with receiving, via a wireless communication protocol, an indication of a space vehicle identification (SVID) and an indication of a frequency error for a space vehicle indicated by the SVID. For example, the case 902 sends information such as the SVID 914 and the frequency error 916 to the user system 102 via the wireless component 922 using BLE. The method 1200 continues at operation 1204 with performing an acquisition procedure for signals from the space vehicle using the frequency error as a starting frequency. For example, the acquisition component 1035 may perform an acquisition procedure on the GNSS satellite 904 indicated by the SVID 1014 received from the case 902 using the frequency error 1016 as a starting point to acquire the GNSS satellite 904 indicated by the SVID 1014.

The additional information from the case enables mobile receivers to obtain location accuracy which is significantly better than a standalone single band receiver. The power consumption is still lower than a standalone single band receiver The method 1200 optionally includes one or more additional operations, the operations of method 1200 can be performed in a different order, or one or more of the operations of the method 1200 can be optional. The method 1200 may be performed in whole or in part by one or more computing devices, or an apparatus of one or more computing devices disclosed herein such as the user system 102, glasses 800, or wearable apparatus 116. The functions of a component, such as the position component 932, are performed or executed by one or more computing devices configured to perform or execute the functions of the component.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" or "module" refers, for example, to a device, physical entity, or logic having boundaries defined by function or subroutine calls, branch points, APIs, or other technologies that provide for the partitioning or modularization of particular processing or control functions. Components or modules may be combined via their interfaces with other components to carry out a machine process. A component or module may be a packaged functional hardware unit designed for use with other components and a part of a program that usually performs a particular function of related functions. Components or modules may constitute either software components (e.g., code embodied on a machine-readable medium) or hardware components. A "hardware component" or "hardware module" is a tangible unit capable of performing certain operations and may be configured or arranged in a certain physical manner. In various examples, one or more computer systems (e.g., a standalone computer system, a client computer system, or a server computer system) or one or more hardware components or software components of a computer system (e.g., a processor or a group of processors) may be configured by software (e.g., an application or application portion) as a hardware component or software component that operates to perform certain operations as described herein. A hardware component or hardware module may also be implemented mechanically, electronically, or any suitable combination thereof. For example, a hardware component hardware module may include dedicated circuitry or logic that is permanently configured to perform certain operations. A hardware component or hardware module may be a special-purpose processor, such as a field-programmable gate array (FPGA) or an application-specific integrated circuit (ASIC). A hardware component or hardware module may also include programmable logic or circuitry that is temporarily configured by software to perform certain operations. For example, a hardware component or hardware module may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component or hardware module mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components or hardware modules can provide information to, and receive information from, other hardware components. Accordingly, the described hardware components or hardware modules may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component or hardware module may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. Additional claimable subject matter further includes the following:

Example 1 is a computing device comprising: one or more processors; and one or more memories storing instructions that, when executed by the one or more processors, configure the one or more processors to perform operations comprising: receiving, via a wireless communication protocol, an indication of a space vehicle identification (SVID) and an indication of a frequency error for a space vehicle indicated by the SVID; and acquiring signals from the space vehicle using the frequency error as a starting frequency.

In Example 2, the subject matter of Example 1 includes, wherein the wireless communication protocol is low-energy Bluetooth®.

In Example 3, the subject matter of any one of Examples 1-2 includes, wherein the receiving further comprises: receiving a ratio of a carrier power over a noise power for a unit bandwidth (C/N); and, wherein the acquiring further comprises: determining an integration time based on the C/N, and acquiring the signals from the space vehicle using the frequency errors as a starting frequency error and using the integration time.

In Example 4, the subject matter of Example 3 includes, where the integration time is 100 microseconds to 3 milliseconds.

In Example 5, the subject matter of any one of Examples 1-4 includes, wherein the operations further comprise: receiving, via the wireless communication protocol, almanac and ephemeris data for the space vehicle indicated by the SVID; and acquiring the signals from the space vehicle using the frequency errors as a starting frequency error and using the almanac and ephemeris data.

In Example 6, the subject matter of any one of Examples 1-5 includes, an L1 global navigation satellite system (GNSS) receiver coupled to the one or more memories, wherein the acquiring uses received signals from the GNSS receiver.

In Example 7, the subject matter of any one of Examples 1-6 includes, wherein the operations further comprise: acquiring signals from one or more additional space vehicles; and tracking the space vehicle and the one or more additional space vehicles to determine a location of the computing device.

In Example 8, the subject matter of Example 7 includes, wherein the computing device is a first computing device and the location is a first location, and wherein the receiving further comprises: receiving, via the wireless communication protocol from a second computing device, the SVID and the indication of the frequency error for the space vehicle indicated by the SVID, and wherein the operation further comprises: adjusting the first location based on the second location.

In Example 9, the subject matter of any one of Examples 7-8 includes, wherein the SVID is a first SVID, the space vehicle is a first space vehicle, and wherein the receiving further comprises: receiving a second SVID, the second SVID indicating a second space vehicle; and, wherein the operations further comprise: refraining from acquiring the signals from the second space vehicle.

In Example 10, the subject matter of any one of Examples 1-9 includes, wherein the operations further comprise: performing a tracking procedure on the space vehicle using a lower power mode.

In Example 11, the subject matter of Example 10 includes, where the lower power mode is between 0.01 Hz and 0.1 Hz.

In Example 12, the subject matter of any one of Examples 1-11 includes, wherein the receiving further comprises: receiving a clock error; and performing a location fix with one fewer space vehicles by using the clock error.

In Example 13, the subject matter of any one of Examples 1-12 includes, wherein the receiving further comprises: receiving information from a case, the information comprising at least one of: a clock error, indications of one or more additional SVIDs, indications of one or more frequency errors for one or more additional space vehicles indicated by the one or more additional SVIDs, one or more ratios of carrier power over noise power for a unit bandwidth (C/N), indications of one or more SVIDs to avoid, one or more atmospheric delays, one or more frequency errors, one or more doppler shifts, almanac and ephemeris information, and a clock error; and perform a position fix for the computing device using information.

In Example 14, the subject matter of any one of Examples 1-13 includes, wherein the acquiring achieves a code lock and a frequency lock on the signals from the space vehicle.

In Example 15, the subject matter of Example 14 includes, wherein the acquiring is performed without directly downloading almanac and ephemeris information from satellite.

In Example 16, the subject matter of any one of Examples 1-15 includes, wherein the computing device is a wearable electronic device configured for one or more of: augmented reality (AR), mixed reality (MR), virtual reality (VR), or extended reality (XR).

In Example 17, the subject matter of any one of Examples 15-16 includes, wherein the indication of the SVID is received from a case for the computing device.

Example 18 is a non-transitory computer-readable storage medium including instructions that, when processed by one or more processors, configure the one or more processors to perform operations comprising: receiving, via a wireless communication protocol, an indication of a space vehicle identification (SVID) and an indication of a frequency error for a space vehicle indicated by the SVID; and acquiring signals from the space vehicle using the frequency error as a starting frequency.

In Example 19, the subject matter of Example 18 includes, wherein the receiving further comprises: receiving a ratio of a carrier power over a noise power for a unit bandwidth (C/N); and, wherein the acquiring further comprises: determining an integration time based on the C/N and acquiring the signals from the space vehicle using the frequency errors as a starting frequency error and using the integration time.

Example 20 is a method performed by at least one processor, the method comprising: receiving, via a wireless communication protocol, an indication of a space vehicle identification (SVID) and an indication of a frequency error for a space vehicle indicated by the SVID; and acquiring signals from the space vehicle using the frequency error as a starting frequency.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

What is claimed is:

1. A computing device comprising:

one or more processors; and one or more memories storing instructions that, when executed by the one or more processors, configure the one or more processors to perform operations comprising:

receiving, via a wireless communication protocol, an indication of a space vehicle identification (SVID) and an indication of a frequency error for a space vehicle indicated by the SVID;

acquiring signals from the space vehicle using the frequency error as a starting frequency; and performing a tracking procedure on the space vehicle using a lower power mode, wherein the lower power mode is between 0.01 Hz and 0.1 Hz.

2. The computing device of claim 1, wherein the wireless communication protocol is a lower energy communication protocol.

3. The computing device of claim 1, wherein the receiving further comprises:

receiving a ratio of a carrier power over a noise power for a unit bandwidth (C/N); wherein the acquiring further comprises:

determining an integration time based on the C/N, and acquiring the signals from the space vehicle using the frequency error as a starting frequency error and using the integration time.

4. The computing device of claim 3, wherein the integration time is 100 microseconds to 3 milliseconds.

5. The computing device of claim 1, wherein the operations further comprise:

receiving, via the wireless communication protocol, almanac and ephemeris data for the space vehicle indicated by the SVID; and acquiring the signals from the space vehicle using the frequency error as a starting frequency error and using the almanac and ephemeris data.

6. The computing device of claim 1, further comprising:

an L1 global navigation satellite system (GNSS) receiver coupled to the one or more memories, wherein the acquiring uses received signals from the GNSS receiver.

7. The computing device of claim 1, wherein the operations further comprise:

acquiring signals from one or more additional space vehicles; and tracking the space vehicle and the one or more additional space vehicles to determine a location of the computing device.

8. The computing device of claim 7, wherein the computing device is a first computing device and the location is a first location, wherein the receiving further comprises:

receiving, via the wireless communication protocol from a second computing device, the SVID and the indication of the frequency error for the space vehicle indicated by the SVID, and wherein the operation further comprises:

adjusting the first location based on a second location.

9. The computing device of claim 7, wherein the SVID is a first SVID, the space vehicle is a first space vehicle, wherein the receiving further comprises:

receiving a second SVID, the second SVID indicating a second space vehicle; and, wherein the operations further comprise:

refraining from acquiring the signals from the second space vehicle.

10. The computing device of claim 7, wherein the receiving further comprises:

receiving a clock error; and performing a location fix with one fewer space vehicles of the one or more additional space vehicles by using the clock error.

11. The computing device of claim 1, wherein the receiving further comprises:

receiving information from a case, the information comprising at least one of: a clock error, indications of one or more additional SVIDs, indications of one or more frequency errors for one or more additional space vehicles indicated by the one or more additional SVIDs, one or more ratios of carrier power over noise power for a unit bandwidth (C/N), indications of one or more SVIDs to avoid, one or more atmospheric delays, one or more frequency errors, one or more doppler shifts, and a clock error; and perform a position fix for the computing device using information.

12. The computing device of claim 1, wherein the acquiring achieves a code lock and a frequency lock on the signals from the space vehicle.

13. The computing device of claim 12, wherein the acquisition, is performed without downloading almanac and ephemeris information directly from satellite.

14. The computing device of claim 13, wherein the indication of the SVID is received from a case for the computing device.

15. The computing device of claim 1, wherein the computing device is a wearable electronic device configured for one or more of: augmented reality (AR), mixed reality (MR), virtual reality (VR), or extended reality (XR).

16. A non-transitory computer-readable storage medium including instructions that, when processed by one or more processors, configure the one or more processors to perform operations comprising:

receiving, via a wireless communication protocol, an indication of a space vehicle identification (SVID) and an indication of a frequency error for a space vehicle indicated by the SVID;

acquiring signals from the space vehicle using the frequency error as a starting frequency; and performing a tracking procedure on the space vehicle using a lower power mode, wherein the lower power mode is between 0.01 Hz and 0.1 Hz.

17. The non-transitory computer-readable storage medium of claim 16, wherein the receiving further comprises: receiving a ratio of a carrier power over a noise power for a unit bandwidth (C/N); and, wherein the acquiring further comprises:

determining an integration time based on the C/N, and acquiring the signals from the space vehicle using the frequency error as a starting frequency error and using the integration time.

18. The non-transitory computer-readable storage medium of claim 16, wherein the wireless communication protocol is a lower energy communication protocol.

19. The non-transitory computer-readable storage medium of claim 16, wherein the receiving further comprises:

receiving a ratio of a carrier power over a noise power for a unit bandwidth (C/N); wherein the acquiring further comprises:

determining an integration time based on the C/N, and acquiring the signals from the space vehicle using the frequency errors as a starting frequency error and using the integration time.

20. A method performed by at least one processor, the method comprising:

receiving, via a wireless communication protocol, an indication of a space vehicle identification (SVID) and an indication of a frequency error for a space vehicle indicated by the SVID;

acquiring signals from the space vehicle using the frequency error as a starting frequency; and performing a tracking procedure on the space vehicle using a lower power mode, wherein the lower power mode is between 0.01 Hz and 0.1 Hz.

* * * * *